Figure 1:
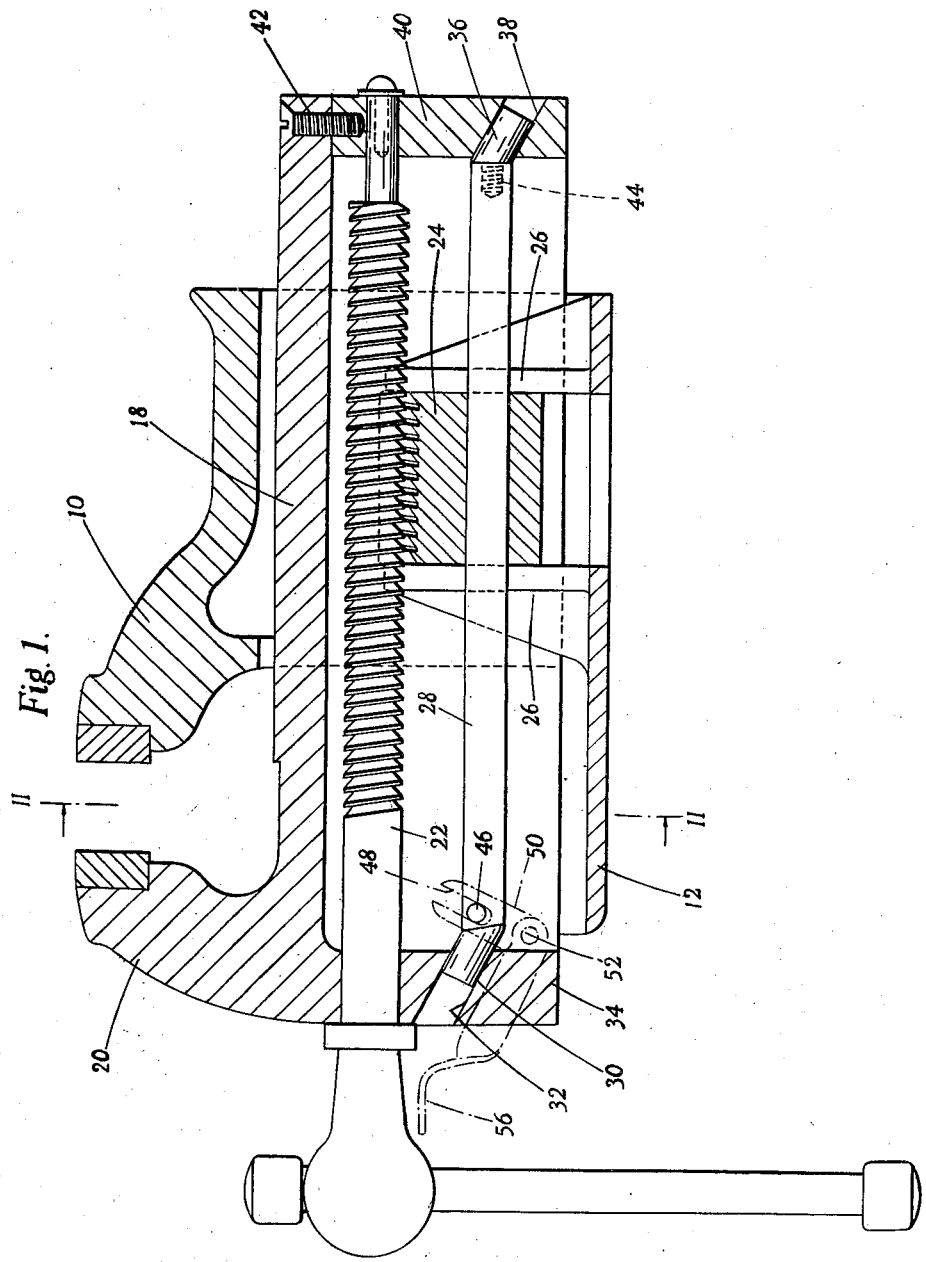

March 19, 1940.    J. W. ROBERTSON    2,194,406
WORK-HOLDING VISE
Filed Oct. 6, 1938    6 Sheets-Sheet 1

Inventor
J. W. ROBERTSON
by
Attorneys

March 19, 1940.   J. W. ROBERTSON   2,194,406
WORK-HOLDING VISE
Filed Oct. 6, 1938   6 Sheets-Sheet 2

Inventor
J. W. Robertson
by
Attorneys

March 19, 1940.　　J. W. ROBERTSON　　2,194,406
WORK-HOLDING VISE
Filed Oct. 6, 1938　　6 Sheets-Sheet 3
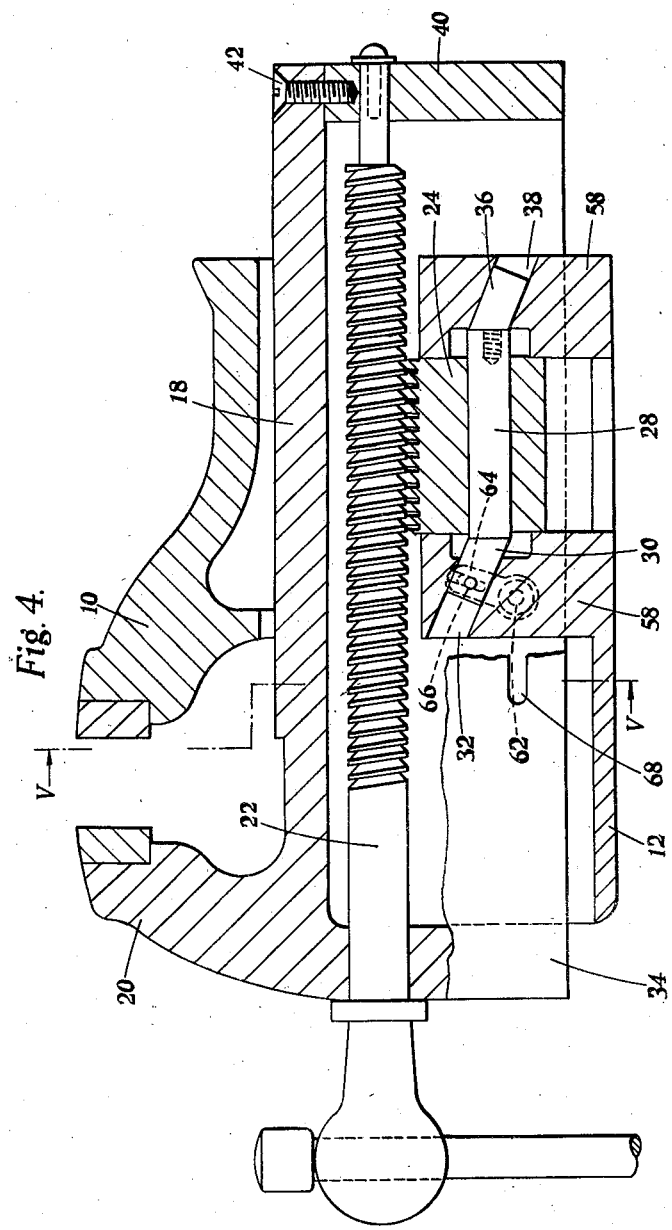
Inventor
J. W. Robertson.
by
Attorneys March 19, 1940.          J. W. ROBERTSON          2,194,406
                        WORK-HOLDING VISE
                      Filed Oct. 6, 1938         6 Sheets-Sheet 4
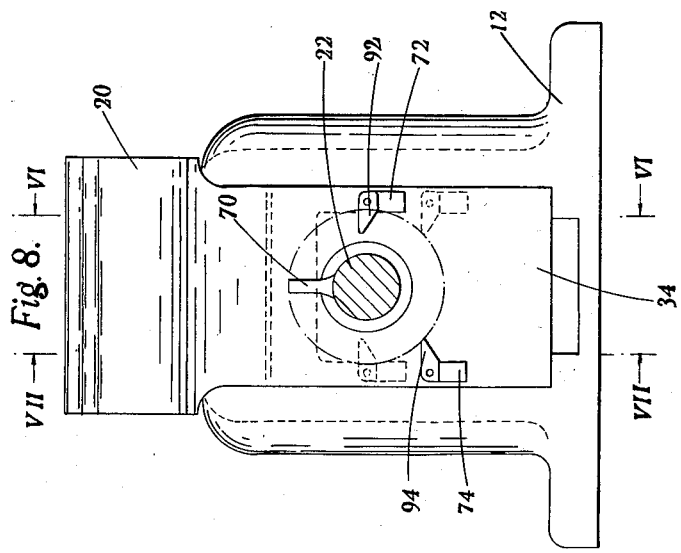
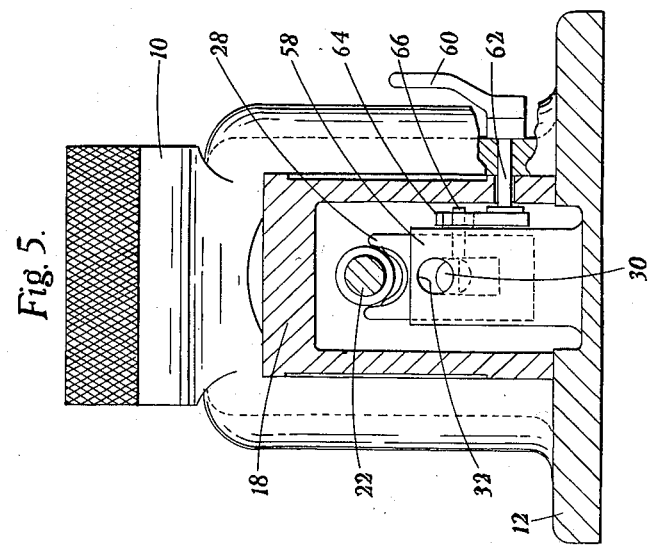
Inventor
J. W. ROBERTSON,
by
Attorneys March 19, 1940.    J. W. ROBERTSON    2,194,406
WORK-HOLDING VISE
Filed Oct. 6, 1938    6 Sheets-Sheet 5

Inventor
J. W. ROBERTSON.
by
Attorneys

March 19, 1940.  J. W. ROBERTSON  2,194,406
WORK-HOLDING VISE
Filed Oct. 6, 1938  6 Sheets-Sheet 6

Inventor
J. W. Robertson,
by
Blair & Kilburn
Attorneys

Patented Mar. 19, 1940

2,194,406

UNITED STATES PATENT OFFICE 2,194,406

WORK-HOLDING VISE

John Watson Robertson, London, England

Application October 6, 1938, Serial No. 233,673
In Great Britain October 7, 1937

4 Claims. (Cl. 81—36)

This invention relates to work-holding vises in which the screw co-operates with a half-nut capable of being moved into and out of engagement with the screw whereby when the half-nut is out of engagement the movable jaw can be adjusted rapidly to a new position without turning the screw.

Hitherto in vises of this kind the half-nut has been controlled by a spring and it is the object of the present invention to avoid the necessity of using springs which are liable to break thereby putting the vise out of action.

According to the present invention the half-nut is mounted in guides in the base or fixed part of the vise so that it can move towards or away from the screw, and is actuated by a cam device movable in a direction lengthwise of the screw and operating to displace the half-nut positively in both directions.

The cam device may consist of a slide in engagement with the half-nut and arranged parallel to the screw, this slide being provided with inclined surfaces co-operating with similarly inclined surfaces formed on the movable part of the vise. The slide can move freely in relation to the half-nut in the direction parallel to the screw but the component of this movement which is transverse to the direction of the screw will cause the half-nut to move in its guides into or out of engagement with the screw according to the direction in which the slide has been moved. Owing to the fact that the slide is parallel to the screw it does not prevent the movement of the movable part of the vise.

In a modified form of the invention the inclined surfaces on the slide co-operate with inclined surfaces on the fixed part of the vise. Thus, the slide does not move in company with the movable part of the vise as in the arrangement first mentioned.

The angle of inclination of the guiding surfaces on the slide is such that forces applied to it in a direction at right angles to its length will not cause it to move in its guides and thus there will be no tendency for the reaction between the screwthreads to disengage the half-nut from the screw.

The movement of the slide may be effected directly by hand, for example through the medium of a pivoted lever carried by the movable jaw, or it may be effected automatically by the rotation of the screw, rotation in the direction to separate the jaws disengaging the half-nut and rotation in the other direction engaging it. This may be effected by providing two pivoted levers connected by pins and slots or similar means to the slide, the ends of these levers co-operating with a projection on the screw. Each lever is arranged so that when it is turned by the corresponding projection it is moved out of the path of the projection and does not again project into that path until the other lever has been operated by reverse rotation of the screw. A part of one of the levers, or of each lever, which is engaged by the projection, is pivoted to the rest of the lever so that when encountered by the projection in the direction opposite to the direction of operation it can move out of the way of the projection.

In a modified form, a single lever is used both to engage and disengage the half-nut being, for example, moved downwards by anticlockwise rotation of the screw to disengage the half-nut, and upwards by clockwise rotation of the screw to engage it, and being provided with a pivoted portion which moves out of the way of the projection when the screw is being rotated clockwise.

Figure 2:
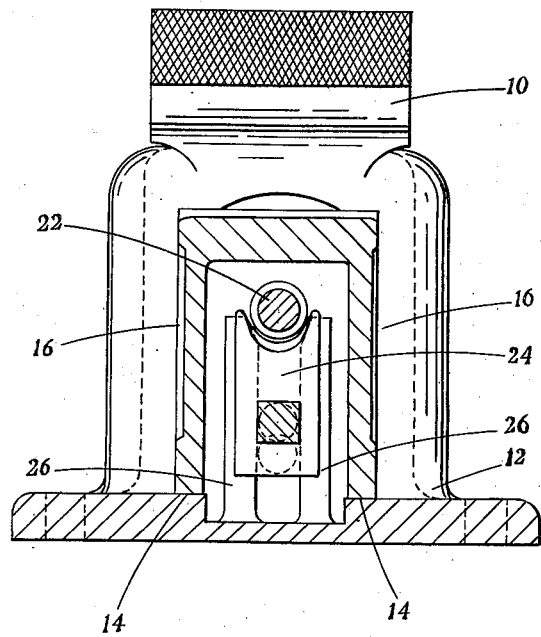
Figure 3:
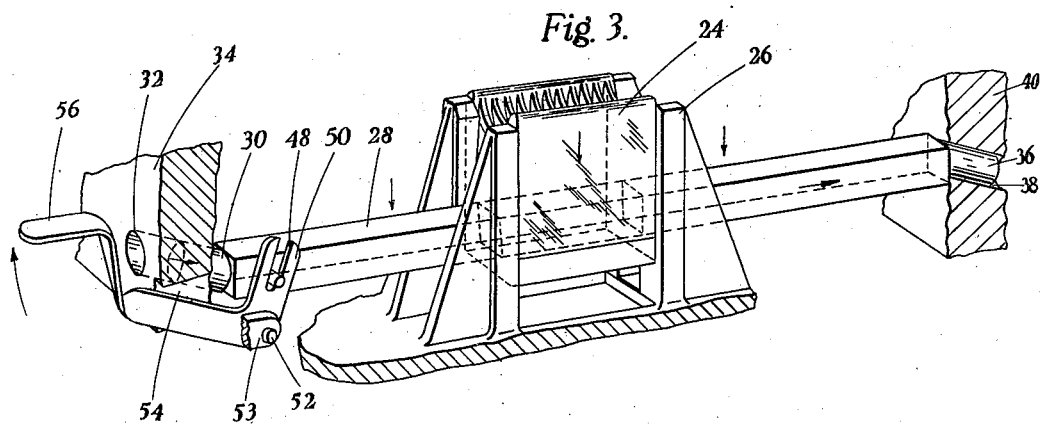
Figure 6:
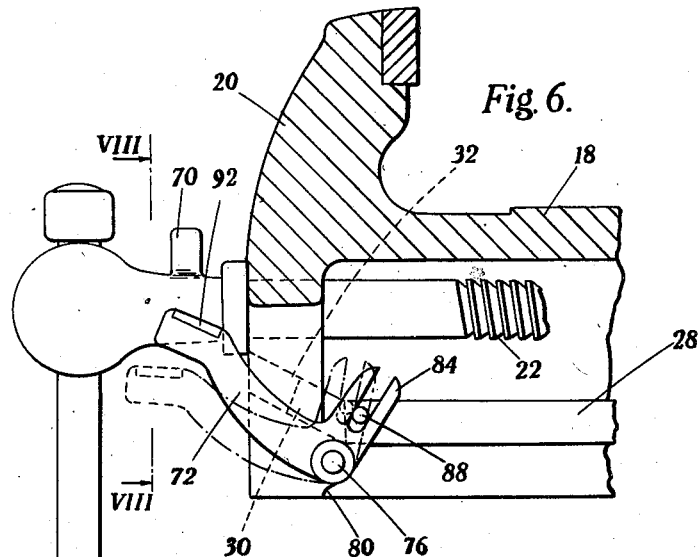
Figure 7:
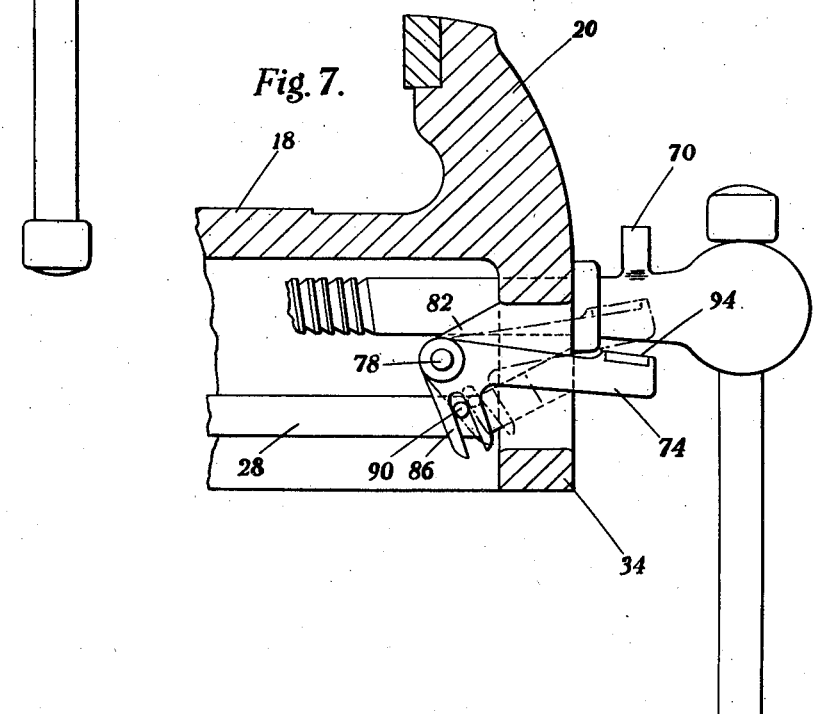
Figure 9:
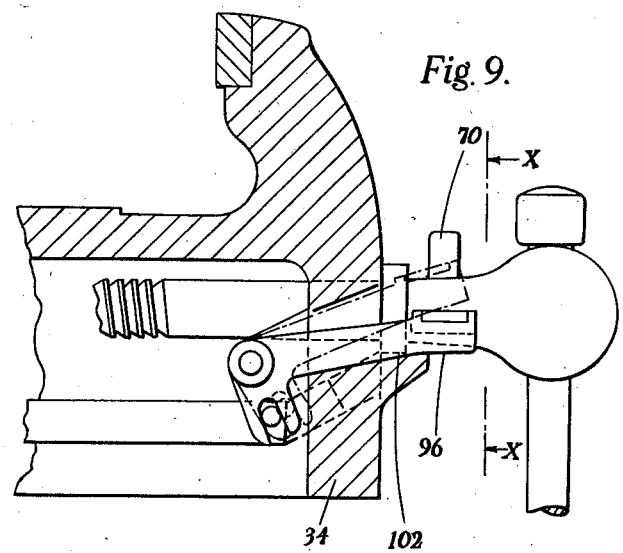
Figure 10:
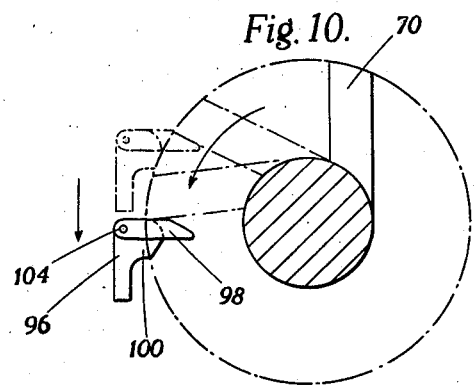
Figure 11:
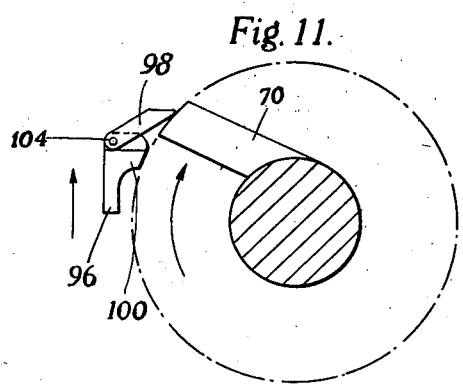

Referring to the accompanying drawings,

Figure 1 is a longitudinal section of a vise constructed according to this invention, Figure 2 is a transverse section on the line II—II in Figure 1, Figure 3 is a perspective view with parts broken away, Figure 4 is a view similar to Figure 1 of a modified construction, Figure 5 is a longitudinal section on the line V—V of Figure 4, Figure 6 is a longitudinal section of a fragmentary part of a vise embodying automatic actuating mechanism, the section being taken on line VI—VI in Figure 8 as seen from the right, Figure 7 is a view similar to Figure 6, the section being taken on the line VII—VII in Figure 8 as seen from the left, Figure 8 is a transverse section on the line VIII—VIII in Figure 6, Figure 9 is a longitudinal section of a fragmentary part of a vise, showing a modification of the construction shown in Figure 4, and Figures 10 and 11 are views in cross-section on the line X—X in Figure 9 illustrating the mode of operation of the device of Figure 9.

Referring to Figures 1 to 3, the fixed vise jaw 10 is a part of a casting comprising also a base 12 having guide surfaces 14, 16 for the slide 18 extending rearwardly from the movable jaw 20. The screw 22 co-operates with a half-nut 24 which is mounted to move vertically in guides 26 forming part of the casting 10, 12 so that it can be moved into and out of engagement with the threads of the screw 22.

A slide 28 in the form of a square bar extends through a square-section hole in the half-nut 24. The slide 28 is parallel to the screw 22. At its front end the slide is formed with an inclined cylindrical extension 30 sliding in an inclined hole 32 in the lower part 34 of the movable jaw casting. At its rear end the slide carries a similar inclined extension 36 sliding in a hole 38 in the rear plate 40 which is secured to the slide 18 by a screw 42. The extension 36 is formed with a screw 44 entering a screwthreaded hole in the rear end of the slide 28, so that the extension can be secured to the slide after the latter has been passed through the hole in the half-nut 24.

Near its front end the slide 28 carries a laterally projecting pin 46 working in a slot 48 in one arm 50 of a bell-crank pivoted at 52 to a lug 53 on the part 34, the other arm of this bell-crank extending through a slot 54 in the part 34 and terminating in a thumbpiece 56.

When the thumbpiece 56 is depressed the bell-crank will be swung in the anticlockwise direction, thereby pulling the slide 28 forwardly—that is to say, to the left in Figures 1 and 3. Owing to the inclination of the extensions 30, 36 the bar will move upwardly as well as forwardly, thereby raising the half-nut 24 to engage it with the thread of the screw 22. The nut may be disengaged by raising the thumbpiece 56 which returns the parts to the positions shown in Figures 1 and 3. When the nut is engaged the slide 28 does not prevent the movement of the movable jaw because it is parallel to the screw. The angle of inclination of the extensions 30, 36 is such that forces applied to the slide 28 in the vertical direction will not cause the extensions to move in their guides 32, 38 and thus there will be no tendency for the reaction between the screwthreads on the half-nut and the screw to disengage the screwthreads.

Referring now to Figures 4 and 5 the slide 28, instead of being carried by the movable part of the vice, is mounted in the fixed part, the extensions 30, 36 sliding in inclined holes 32, 38 in the guide members 58, between which the half-nut slides. In this case the slide is operated by a hand lever 60 at the side of the vise, this hand lever being fixed to a spindle 62 mounted to rotate in a hole in the side of the casting 10, 12 as shown in Figure 5, and carrying a forked lever 64 at its inner end which engages a pin 66 fixed to the extension 30, this pin working in a slot (not shown) in the side of the part 58. The side of the movable part of the vise is formed with a slot 68 to clear the spindle 62 and allow the movable jaw to slide within the fixed jaw.

In Figures 6, 7 and 8 an arrangement is illustrated in which the half-nut is automatically engaged and disengaged by the rotation of the screw. To effect this the part of the screw which protrudes from the front of the movable jaw 20 is formed with a radial projection 70 which co-operates with two levers 72, 74, one on either side of the screw. These levers are pivoted at 76, 78 respectively to lugs 80, 82 carried by the part 34 and they protrude through slots in that part as shown. They carry forked extensions 84, 86 respectively co-operating with pins 88, 90 extending from the sides of the slide 28. The two levers are arranged as clearly shown in Figures 6 and 7 so that depression of the lever 72 will move the slide 28 forwards and upwards to engage the nut, while depression of the lever 74 will move the slide rearwards and downwards to disengage the half-nut. It follows, therefore, that when the screw is rotated clockwise as seen in Figure 8 to close the vise, the projection 70 will encounter the lever 72 and depress it so as to engage the half-nut. Anticlockwise rotation of the screw, on the contrary, will cause the projection 70 to depress the lever 74, thereby disengaging the half-nut.

It will be appreciated that after the lever 72 has been depressed by clockwise rotation of the screw the lever 74 will have been raised so as to be ready to be engaged by the projection 70 when the screw is rotated anticlockwise. In order that neither of the levers shall prevent continued rotation of the screw in either sense, both of them are provided with pivoted latches 92, 94 respectively. As shown clearly in Figure 8 these latches extend inwards into the path of the projection 70. When the screw is rotated clockwise the projection encounters the latch 92 forming part of the lever 72, depressing the lever, and continued rotation results in the projection slipping past the tip of the latch. The lever 74 will have been raised by this operation into the position shown in dotted lines in Figure 8, but the projection 70 encounters the underside of the latch 94 and swings this latch upwardly. Thus, the screw can be rotated continuously in the clockwise direction to close the vise.

Similarly, when the screw is rotated anticlockwise to depress the lever 74 and disengage the half-nut, the screw can be rotated further in the anticlockwise direction because the projection 70 can swing the latch 92 out of the way. In practice, however, once the half-nut has been disengaged it is not required to continue anticlockwise rotation of the screw and it would therefore be possible to omit the latch 92. It is, however, preferred to provide both levers with latches in order to avoid risk of damage.

In Figures 9, 10 and 11 an arrangement is shown in which only one lever is employed. This lever 96 is arranged like the lever 74 of Figures 7 and 8, that is to say, it is on the left-hand side of the screw, and is depressed by the projection 70 when the screw is rotated anticlockwise. It is provided with a pivoted latch 98. The arrangement differs from that of the lever 74, however, in that an inward extension 100 of the lever, beneath the latch 98, is provided which is engaged from below by the projection 70 when the screw is rotated clockwise. This results in the lever being raised to engage the half-nut. When the position shown in full lines in Figure 11 is reached the projection 70 slips past the extension 100 and raises the latch 98. The arrangement differs from that described with reference to Figures 6, 7 and 8 also in that the lever when depressed beds down on a surface 102 provided in the part 34 (see Figure 9) in such a position that, as shown in Figure 10, the projection 70 is still in engagement with the top of the latch 98. In this form of the invention, therefore, the screw cannot be rotated in the anticlockwise direction after the nut is disengaged. As will be apparent from Figures 9 and 10, the construction is robust enough to withstand the shock consequent on the sudden arresting of the screw, and it will further be noticed that the tip of the projection 70 comes to rest on a part of the top of the latch 98 intermediate between the pivot 104 of the latch and the edge of the extension 100. There is therefore no tendency for the pivot pin to be sheared;

all that happens is that the latch is pressed firmly down on to the extension 100.

I claim:

1. The combination with a work-holding vise having a half-nut mounted in guides to move into or out of engagement with the screw, of a cam device movable in a direction lengthwise of the screw and adapted to displace the half-nut positively in both directions, and means for actuating said cam device comprising a lateral projection on the screw and a lever operatively connected to the cam device and adapted to be moved into one extreme position by the projection on rotation of the screw in one direction, and to be moved into its other extreme position by the projection on rotation of the screw in the other direction.

2. The combination with a work-holding vise having a half-nut mounted in guides to move into or out of engagement with the screw, of a cam device movable in a direction lengthwise of the screw and adapted to displace the half-nut positively in both directions, and actuating means for said cam device comprising a lateral projection on the screw and two levers each operatively connected to the cam device and situated on opposite sides of the screw, one of said levers being adapted to be moved by the projection on the screw to engage the half-nut on clockwise rotation of the screw and the other lever being adapted to be moved by the projection to disengage the half-nut on anticlockwise rotation of the screw.

3. The combination with the elements of claim 1 of a latch pivoted to the lever and adapted always to be in the path of the projection and to yield to allow said projection to pass on rotation of the screw in one direction.

4. The combination with the elements of claim 2 of two latches one pivoted to each of said levers and lying in the path of the projection each latch being adapted to yield to allow the projection to pass, one in one direction of rotation of the screw and the other in the opposite direction of rotation.

JOHN WATSON ROBERTSON.